United States Patent
Spragg et al.

[11] 3,922,123
[45] Nov. 25, 1975

[54] CORE REMOVAL APPARATUS

[75] Inventors: Charles D. Spragg, Brunswick; Walter Tomaszewski, Canton, both of Ohio

[73] Assignee: The Firestone Tire & Rubber Company, Akron, Ohio

[22] Filed: Jan. 29, 1975

[21] Appl. No.: 544,989

[52] U.S. Cl. .................................................. 425/48
[51] Int. Cl.² ............................................ B29H 5/08
[58] Field of Search ............ 425/32, 33, 46, 47, 48, 425/49, 50, 54, 55, 56, 57

[56] References Cited
UNITED STATES PATENTS

| | | | |
|---|---|---|---|
| 1,101,732 | 6/1914 | Doughty | 425/50 X |
| 1,288,733 | 12/1918 | Stevens | 425/48 X |
| 1,326,294 | 12/1919 | Shea | 425/48 |
| 1,370,101 | 3/1921 | Dykes | 425/55 X |
| 1,388,255 | 8/1921 | Hardeman | 425/48 X |
| 1,438,930 | 12/1922 | Midgley | 425/48 |
| 1,522,446 | 1/1925 | Haas | 425/48 X |
| 3,358,330 | 12/1967 | Pacciarini et al. | 425/54 X |
| 3,459,849 | 8/1969 | DeRonde | 425/32 X |

*Primary Examiner*—J. Howard Flint, Jr.

[57] ABSTRACT

The present invention discloses an apparatus for removing a multi-section core from a vehicle tire and the apparatus includes a frame which pivotally mounts a support table so the support table can be moved between a first position, in which it is generally horizontal, to a second position, in which it is at an acute angle to the horizontal. The support table carries roller means which are adapted to engage a sidewall of and rotatably support a tire in a position with the axis of the tire generally at a right angle to the support table. A core clamp is positioned within the circumferential confines of the tire when it is supported by the rollers in the horizontal position of the support table and the core clamp is adapted to move between first and second longitudinal positions. The core clamp has jaws thereon, which are adapted to move between open and closed positions to grasp a selected section of a multi-section core and longitudinal movement of the core clamp causes the selected section of the core to be pulled from the tire in a direction generally parallel to the support table and in a diametral direction in relation to the tire. A backup support is provided for engaging a portion of the tread area of the tire to prevent movement of the tire when the core clamp is removing a core section from the tire. A rotatable spindle, which is movable between first and second positions, is provided to engage a portion of the tread area of the tire at a position generally diametrically opposed from the backup support. The spindle rotates the tire to desired rotational positions to properly position the various core sections so they can be engaged by the jaws of the core clamp. Motive power means are provided in the apparatus to cause all of the aforementioned movements and to cause rotation of the spindle.

11 Claims, 7 Drawing Figures

CORE REMOVAL APPARATUS

The present invention relates to the removal of segmented cores from cast vehicle tires.

It is common in the manufacturers of cast vehicle tires, for example centrifugally cast polyurethane tires, to utilize a multi-piece metal core member to form the inner contour of the tire during casting. After the tire has been cast, it is then necessary to remove the core from the tire so the core may be utilized again in the casting of another tire.

Cores are presently removed from finished tires by a hand operation by use of appropriate hand tools. The present means of core removal presents several problems among which are the danger of injury to the hands of a worker, as well as damage to the tire, particularly in the bead area, and loss of life expectancy of the core segments.

The present invention discloses an apparatus for at least semi-automatically removing the core segments from the tire in a manner which allows both tire sidewalls to flex and release the core segments simultaneously thereby minimizing the possibility of damage in the bead area. The apparatus, also, lessens physical abuse to the core segments thus increasing their life expectancy. Danger to workmen removing the cores is, also lessened.

Other objects and a fuller understanding of this invention may be had by referring to the following description and claims, taken in conjunction with the accompanying drawings, in which:

Figure 1:
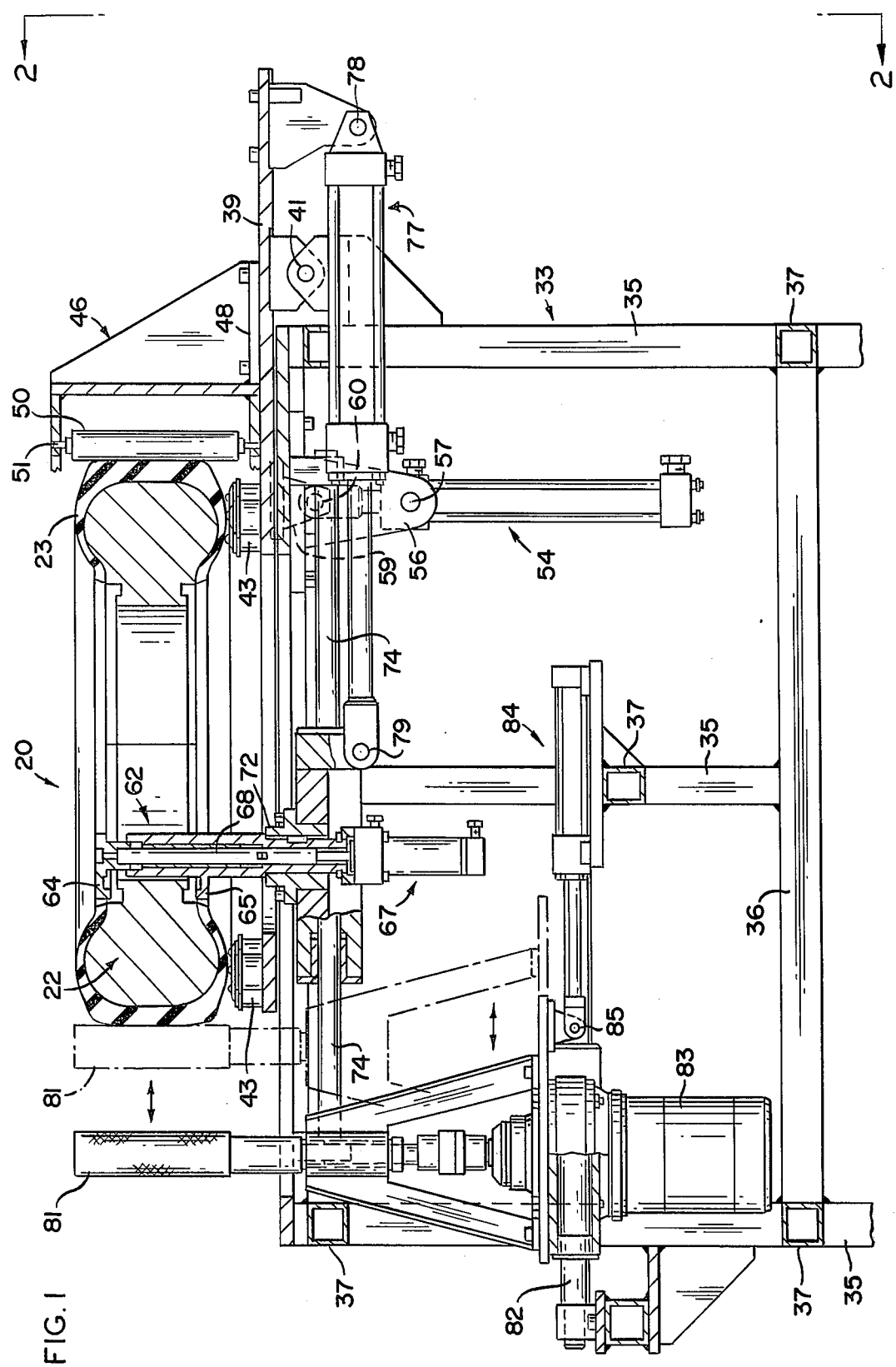
FIG. 1 is an elevational view partially in section illustrating the core removal apparatus of the present invention.
Figure 2:
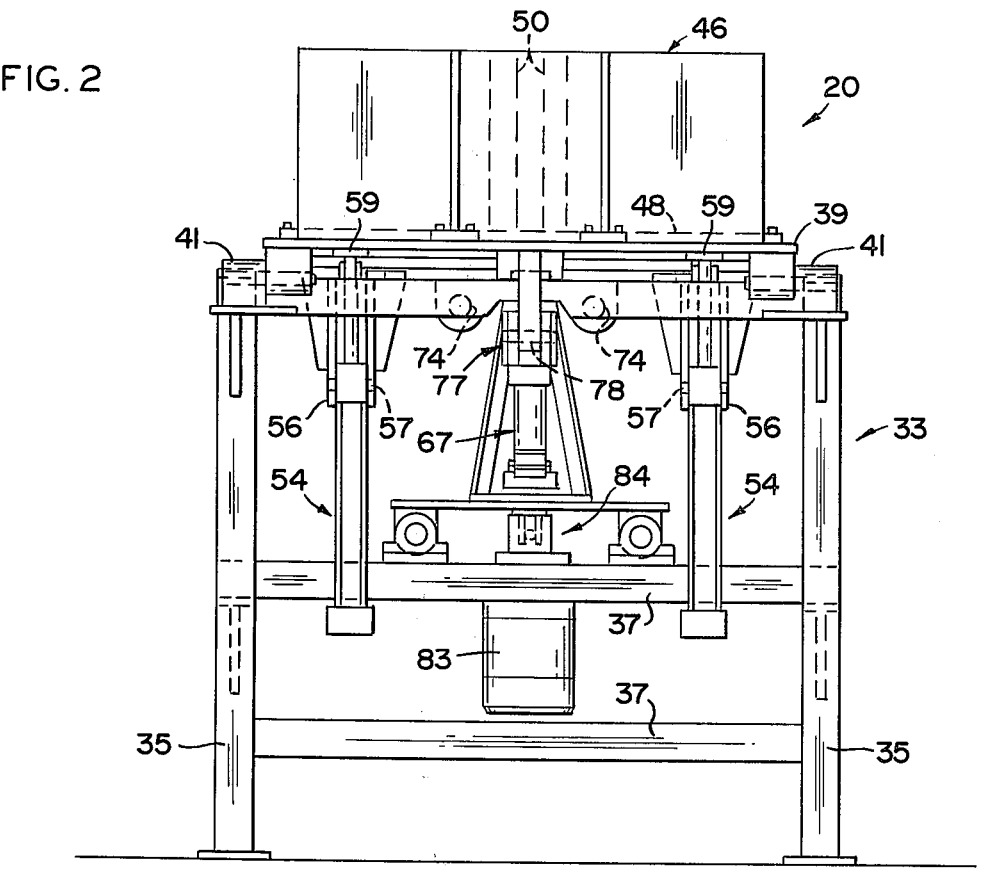
FIG. 2 is an end view of the apparatus shown in FIG. 1 taken generally along the line 2—2 of FIG. 1.

The core removal apparatus of the present invention which is shown in the drawings and has been indicated generally by the reference numeral 20. As stated hereinabove, the present apparatus is designed for removing, on a piece-by-piece basis the plurality of segments which make up a multi-section core 22. In the drawings this core is shown as made up of five core sections or segments which have been numbered or identified as 26, 27, 28, 29 and 30. The core section 26 will be referred to herein at times as the key section.

Figure 4:
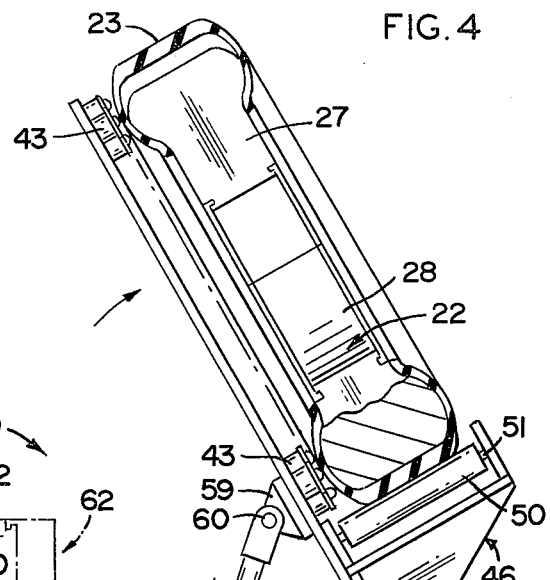
FIG. 4 is a view of the core removal apparatus taken in the same direction as FIG. 1; however, this view differs from FIG. 1 in that the table of the apparatus has been raised to a second position and the core clamp is shown holding a core segment just removed from a tire.

The apparatus includes a frame 33 which is comprised primarily of a number of vertically extending support members 35 appropriately secured to a plurality of horizontally extending support sections 37 by welding and as best seen in FIG. 1. A support table 39 is pivotally connected to or mounted on the frame 33 as at 41 and this support table is adapted to move between a first position in which it is generally horizontal and in which it is seen in FIG. 1 and a second position in which it is at an acute angle to the horizontal and in which it is seen in FIG. 4. Roller means 43 comprising a plurality of ball casters are rotatably mounted on the support table 39 so as to be capable of rotating about axes which are perpendicular to the support table 39. These ball casters 43 are adapted to engage the side wall of a tire 23 so as to rotatably support the tire in a position with the periphery or circumferential extent of the tire being generally parallel with the support table and the axis of the tire extending at a right angle thereto.

Figure 3:
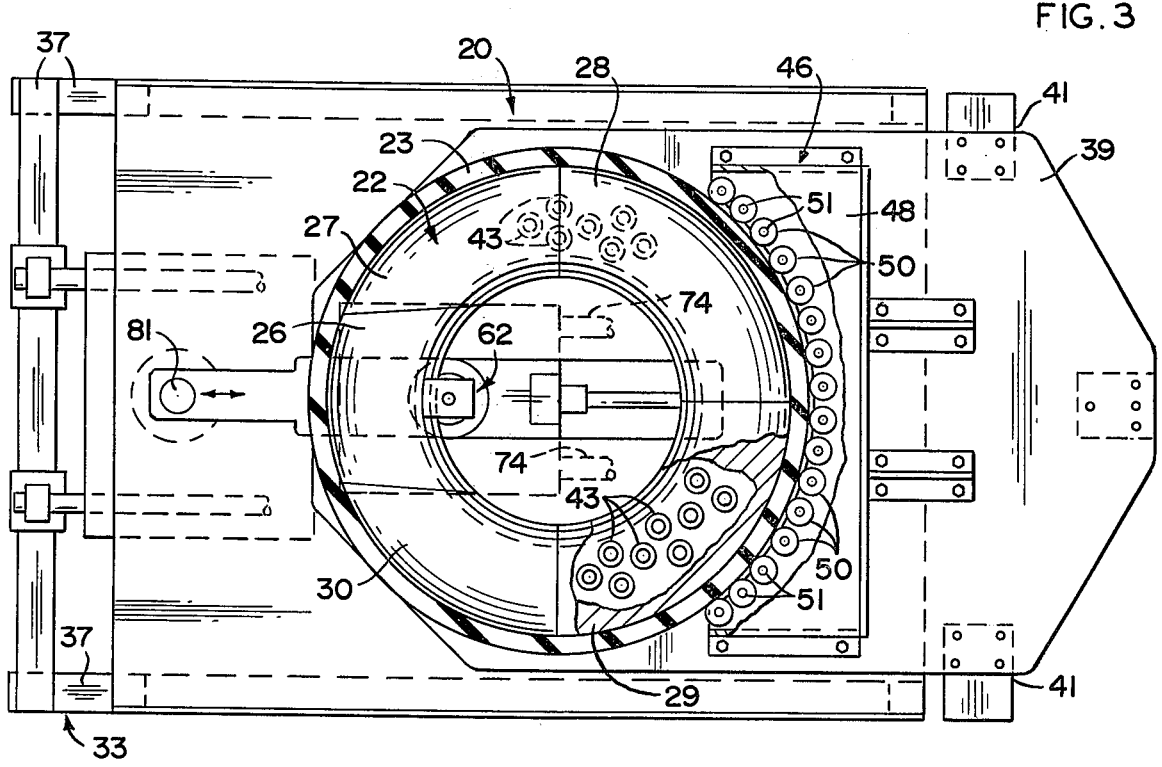
FIG. 3 is a plan view of the apparatus shown in FIGS. 1 and 2 with some parts broken away.
Figure 5:
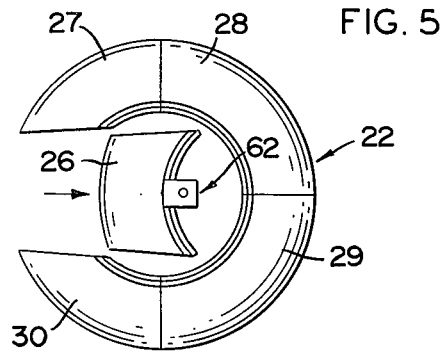
FIG. 5 is a plan view of the core (taken in the same direction as FIG. 3) and showing one of the core segments in retracted or withdrawn position.

In the normal manufacturing process of producing a centrifugally cast tire of polyurethane or other appropriate material, the finished tire, after casting, contains a multisection core which is the case illustrated in FIG. 1. The support table 39, also, carries a backup support 46 which is provided for the purpose of engaging a portion of the tread area of the tire 23 to prevent its removal from the table when the apparatus is in the process of physically removing a core section from the tire. The backup support 46 includes what will be referred to as a tire brace 48 bolted to the support table top and this tire brace serves to mount a plurality of cylindrical rollers 50 which are adapted to rotate about pivot members 51 in the manner illustrated in the drawings. In the plan view of FIG. 3 it will be seen that the cylindrical rollers 50 extend through an arc of slightly greater than 90° to assure that when a force is applied to the tire to remove a core segment, it will not move the tire from the support table 39.

Figure 6:
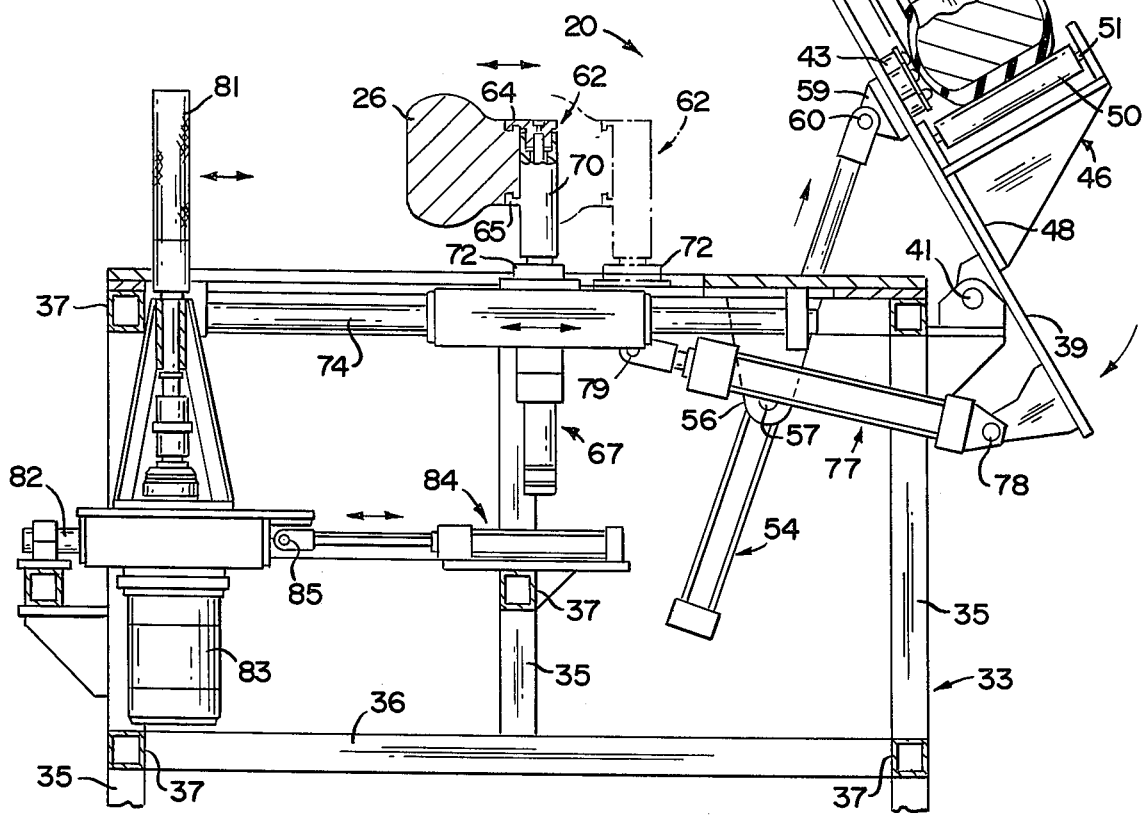
FIg. 6 is an enlarged fragmentary elevational view; partially in section, showing the core clamp in unclamped position.
Figure 6:
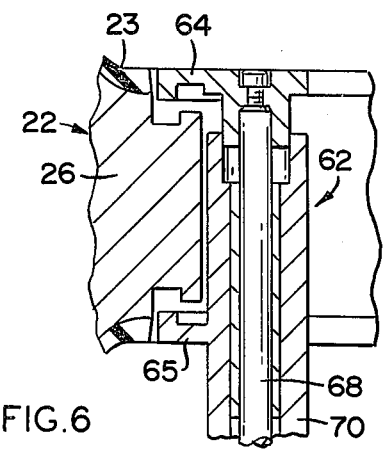
Figure 7:
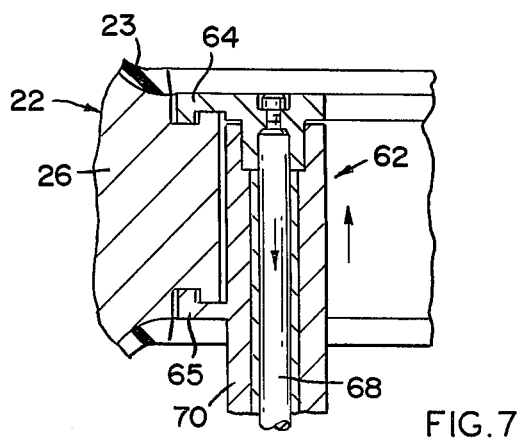
FIG. 7 is a view like FIG. 6, but showing the core clamp in clamped position.

Means are provided for pivotally moving the support table 39 between the aforementioned first and second positions shown respectively in FIGS. 1 and 4 of the drawings. This means includes two piston-cylinder arrangements which are identical in construction and so both have been identified by the reference numeral 54. These piston and cylinder arrangements 54 are pivotally connected by means of the cylinder being connected to the frame 33 by a bracket 56 and a pivot member 57 and the piston rod portion of the piston-cylinder arrangement 54 being connected to the support table 39 by means of a bracket 59 and pivot member 60. A core clamp 62 is positioned within the tire 23 and is adapted to move between first and extreme longtiudinal positions in a generally horizontal direction. The core clamp 62 includes jaw members 64 and 65. The jaw member 64 is connected to the piston of a piston-cylinder arrangement 67 by means of a rod 68 and the jaw member 65 is connected to a cylinder 70 which surrounds the rod 68 and which in turn is physically connected to the cylinder part of the piston-cylinder arrangement 67. The jaw members 64 and 65 are shown in retracted position in FIG. 1 and FIG. 6 of the drawings and in FIG. 4 and FIG. 7 the jaw members are shown in engaged or activated condition. In order to move the jaw members from the disengaged position to the engaged position to grasp a core section (26–30), it is only necessary that the piston-cylinder arrangement 67 be activated which causes the rod 68 to move downwardly which moves jaw 64 and since the cylinder 70 is connected to the piston-cylinder arrangement and is free to move axially in a bushing 72, then the jaw member 65 moves upwardly into engagement with the core section. FIG. 4 of the drawings shows in dotted lines the core clamp 62 in its extreme travel to the right of FIG. 1 shows the core clamp moved to the left. It will be observed from the drawings that the core clamp 62 is mounted for movement between its extreme longitudinal positions by means of the guide rod 74. With the table 39 in raised position (FIG. 4) the core clamp can be moved to the extreme left within the limits of the guide rod 74.

Means are provided for moving the core clamp 62 between the referred to first and second positions and this means includes another piston-cylinder arrangement 77 with the cylinder being pivotally connected to the support table at 78 and with the piston portion being pivotally connected to the core clamp 62 as at 79.

A rotatable spindle 81 is mounted on a a guide rod 82 carred by the frame 33 and is movable back and forth between first and second positions to engage a portion of the tread area of the tire 23 at a position generally diametrically opposed to the back-up support 46. The first position is shown in the full line drawing of FIG. 1 and the second position is shown in dot-dash lines in FIG. 1. Rotation of the rotatable spindle is accomplished by means of an electric motor 83 suitably mounted as illustrated in FIG. 1. Means are provided for moving the rotatable spindle 81 between the aforementioned first and second positions and this means includes still another piston-cylinder arrangement 84 with the cylinder portion being fixedly secured to one of the horizontally extending support members 37 as shown and with the piston portion of the piston-cylinder arrangement being pivotally connected to the rotatable spindle as at 85.

The operation of the core removal apparatus 20 is as follows.

A tire 23 is placed in position upon the roller means 43 of the support table 39 in the position shown in FIG. 1 of the drawings and with the core clamp 62 positioned essentially in the position shown in FIG. 1 of the drawings. It is to be understood that the tire as placed in this position contains the five core sections numbered 26 throught 30. The core clamp is next moved from the position shown in the dotted position of FIG. 4 (with the table down) to the position shown in FIG. 1 with the jaw members 64 and 65 in the retracted position. This movement is accomplished by means of the piston-cylinder arrangement 77. When the core clamp has reached the position shown in FIG. 1, the jaw members 64 and 65 are brought together by actuation of the piston-cylinder arrangement 67 to engage opposed grooves in the core section 26 and the core section is grasped or held as shown in FIG. 4. With the core section so held by the core clamp, the piston-cylinder arrangement 77 is again actuated moving the core clamp 62 to the right from the position as shown in FIG. 1 to the dotted line position of FIG. 4 which physically withdraws the core section 26 from the tire 23. After the core section has been removed to the position shown in FIG. 4, the support table is caused to be moved from the position shown in FIG. 1 to the position shown in FIG. 4 by actuation of the piston-cylinder arrangements 54. This moves the tire and the support table 39 out of the way of the core clamp which is now holding the removed core section and the core clamp 62 moves to the full line position of FIG. 4. The piston-cylinder arrangement 77 is again actuated moving the core clamp 62 to its extreme position to the left at which position an operator of the mechine grasps the core section, the piston-cylinder arrangement 67 is next actuated releasing the jaws 64 and 65 and the operator removes the core section 26 from the apparatus. It will be appreciated that the core section might be moved to a conveyor belt or similar conveying mechanism and dropped thereon and transported to any desired place.

It will be appreciated by those skilled in the art that as the core section 26 is being physically removed from the tire in the aforementioned manner, the backup support 46 engages the tire and physically restrains it from moving. After the operator has removed the core section 26, the piston-cylinder arrangement 77 moves the core clamp 62 back to the position shown in FIG. 4 and the support table 39 is then lowered by actuating the piston-cylinder arrangement 54. The spindle 81 is then moved into engagement with the tire 23 and rotatated by the motor 83 which brings another of the core sections (27–30) into position to be extracted in a manner exactly as described above in the removal of the core section 26. After all of the core sections have been removed, it is, then, only necessary that another tire containing core sections placed in position upon the roller means 43 and the above described procedure can then be repeated.

It will seem from the above description that a convenient automated system has been provided for removing core sections from a cast tire. The means of removal allows both sidewalls of the tire to flex thereby minimizing the possibility of damage in the bead area. The lessening of danger to workmen will be apparent, as well as increasing the life expectancy of the core segments.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Apparatus for removing a multi-section core from a cast vehicle tire including in combination a frame, a support table pivotally connected at one end portion to said frame and adapted to move between a first position in which it is generally horizontal and a second position in which it is at an acute angle to the horizontal, roller means mounted on said support table and adapted to engage a sidewall of and rotatably support a tire in a position with the periphery of the tire being generally parallel with said support table and the axis of the tire extending at a right angle thereto, the tire after casting adapted to contain a multi-section core, means for moving said support table between said first and second positions, a core clamp positioned within the tire supported by said rollers and adapted to move between first and second longitudinal positions, means for moving said core clamp between said first and second positions, said core clamp adapted to move between open and closed positions to grasp a selected section of a multi-section core and longitudinal movement of said core clamp causes the selected section of the core to be pulled from the tire in a direction generally parallel to said support table and in a diametral direction in relation to the tire, means for moving said core clamp between open and closed positions, a backup support for engaging a portion of the tread area of the tire to prevent movement of the tire when said core clamp is removing a core section from the tire, a rotatable spindle movable between first and second positions to engage a portion of the tread area of the tire at a position generally diametrically opposed from said backup support, means for moving said rotatable spindle between said first and second positions, and means for rotating said rotatable spindle in said first position thereof to rotate the tire.

2. Apparatus for removing a multi-section core from a vehicle tire including in combination a frame, a support table pivotally connected at one portion to said frame and adapted to move between a first position and second position, means mounted on said support table and adapted to engage and rotatably support a tire, the tire adapted to contain a multi-section core, means for moving said support table between said first and second positions, a core clamp positioned within the tire and adapted to move between first and second longitudinal positions, means for moving said core clamp between said first and second positions, said core clamp adapted to move between open and closed positions to engage a selected section of a multi-section core and longitudinal movement of said core clamp causes the selected section of the core to be pulled from the tire in a diametral direction in relation to the tire, means for moving said core clamp between open and closed positions, means engaging a portion of the tire to prevent movement of the tire when said core clamp is removing a core section from the tire, and means for rotating the tire to different rotational positions.

3. Apparatus for removing a multi-section core from a vehicle tire including in combination a frame, a support table pivotally connected at one portion to said frame and adapted to move between a first position and a second position, means on said support table adapted to engage and rotatably support a tire, the tire adapted to contain a multi-section core, means for moving said support table between said first and second positions, a core clamp adapted to move between first and second positions, means for moving said core clamp between said first and second positions, said core clamp adapted to move between open and closed positions to engage a selected section of a multi-section core and movement of said core clamp causes the selected section of the core to be pulled from the tire, means for moving said core clamp between open and closed positions, and means engaging a portion of the tire to prevent movement of the tire when said core clamp is removing a core section from the tire.

4. Apparatus for removing a multi-section core from a vehicle tire including means for mounting a tire, a core clamp located at said mounting means and adapted to move between first and second positions, means for moving said core clamp between said first and second positions, said core clamp having jaw means adapted to move between open and closed positions to grasp a section of a multi-section core, said core clamp when moved from said first to said second position with said jaw means thereof closed and grasping a core section of a multi-section core removing the core section from the vehicle tire.

5. Apparatus as claimed in claim 4, wherein said means for mounting a tire mounts the tire for rotation and the movement of said core clamp between said first and second positions is a substantially straight line movement.

6. Apparatus as claimed in claim 5, wherein means are provided for moving said means for mounting a tire away from said core clamp so as not to be engaged thereby in said movement of said core clamp.

7. Apparatus as claimed in claim 5, wherein means are provided for rotating the tire.

8. Apparatus as claimed in claim 5, wherein said straight line movement is generally diametral with respect to the tire and backup means are provided to engage the tire to keep it in place in opposition to the forces tending to move the tire when the core section is removed from the tire.

9. A core removing apparatus for use in removing a core member from a vehicle tire including in combination a support table adapted to support a tire with a core member therein, said support table adapted to move from a horizontal position to a nonhorizontal position, a core clamp mounted on a slide for back and forth movement in a horizontal plane and located within the circumferential confines of a tire positioned on said support table in its horizontal position, jaw means on said core clamp movable between open and closed positions to engage a core member contained in a tire, means for moving said jaw means between open and closed positions, means for moving said support table from said horizontal to said nonhorizontal position whereat said support table and a tire carried thereby are located out of the line of travel of the back and forth movement of said core clamp, and means for moving said core clamp on said back and forth movement.

10. Apparatus as claimed in claim 9, wherein backup means are provided on said support table to engage a tire to resist the force of removal of the core member from the tire.

11. Apparatus as claimed in claim 10, wherein means are provided to rotate the tire on said support table to desired angular positions.

* * * * *